No. 746,714. PATENTED DEC. 15, 1903.
C. W. LASITER.
PEANUT STEMMER.
APPLICATION FILED MAR. 13, 1903.
NO MODEL.

Witnesses
Charles Morgan

Inventor
C. W. Lasiter
by
Chandlee & Chandlee
Attorneys

No. 746,714.

Patented December 15, 1903.

UNITED STATES PATENT OFFICE.

CHARLES W. LASITER, OF SUNBURY, NORTH CAROLINA.

PEANUT-STEMMER.

SPECIFICATION forming part of Letters Patent No. 746,714, dated December 15, 1903.

Application filed March 13, 1903. Serial No. 147,664. (No model.)

*To all whom it may concern:*

Be it known that I, CHARLES W. LASITER, a citizen of the United States, residing at Sunbury, in the county of Gates, State of North Carolina, have invented certain new and useful Improvements in Peanut-Stemmers; and I do hereby declare the following to be a full, clear, and exact description of the invention, such as will enable others skilled in the art to which it appertains to make and use the same.

This invention relates to peanut harvesters or pickers; and it has for its object to provide an attachment through which the peanuts will be passed after they are picked and by means of which the stems of the nuts which are left by the picker will be effectually removed, a further object of the invention being to provide a construction which will insure removal of the stems of various sizes and in the operation of which the nuts themselves will not be injured in any way.

Other objects and advantages of the invention will be understood from the following description.

Figure 1:
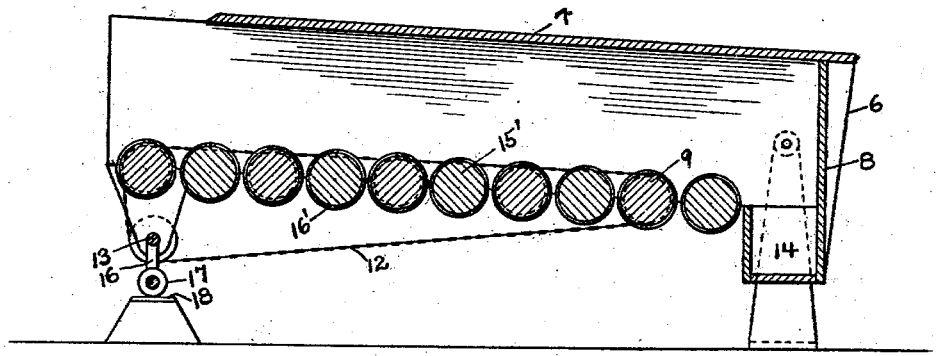
Figure 2:
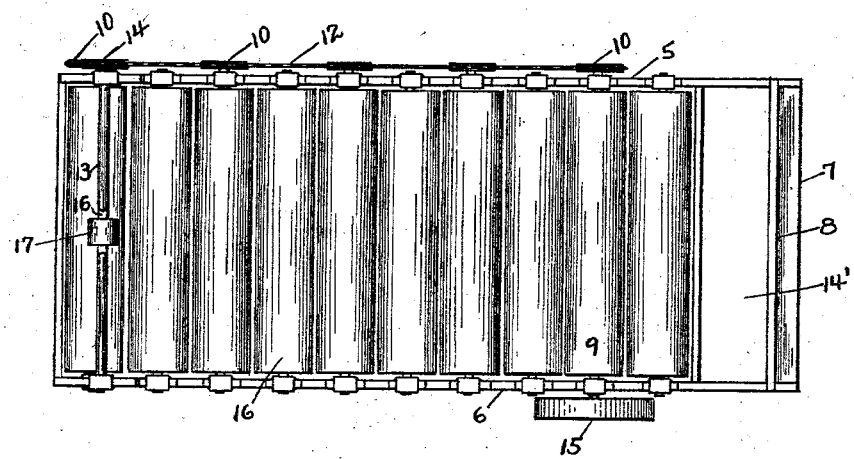

In the drawings forming a portion of this specification, and in which like numerals of reference indicate similar parts in both views, Figure 1 is a vertical section taken longitudinally through the stemmer. Fig. 2 is a bottom plan view of the stemmer.

Referring now to the drawings, there is shown a stemming attachment for peanut-pickers consisting of a rectangular casing, including the vertical sides 5 and 6, the top 7, and the lower or rear end 8, the upper or inlet end of the casing being open and the top 7 terminating short of the sides of this open end to permit of ready supply of peanuts to the casing.

Between the sides of the casing, at the lower edges thereof, are arranged a transverse series of rollers 9, having trunnions rotatably mounted in the sides of the casing, and each alternate one of these rollers, beginning with the open or upper end of the casing, has a sprocket-wheel 10 secured to the trunnion, at one end thereof, said trunnion for this purpose projecting through the side of the casing. At the upper end of the casing is disposed a transverse shaft 13, having a pulley 14 at one end, over which is passed a chain 12, which passes also around the endmost pulley 10 at the opposite end of the casing, one side of the belt between these pulleys passing alternately over and under the intervening pulleys.

It will be noted that the roller 9, which is the second roller from the lower or closed end of the casing, has a second pulley-wheel 15 at its opposite end from the pulley-wheel 10 to receive a driving-belt for rotating the entire series of rollers.

The shaft 13 has a central laterally-displaced or crank portion 16, which is provided with a roller 17, that works upon a wear-plate 18, and the lower or opposite end of the casing is pivoted, so that as the shaft rotates the crank will give a vertical motion to the upper end of the casing to shake the peanuts and cause them to travel more freely from end to end of the apparatus. Beyond the series of rollers 9—that is, at the closed or lower end of the casing—is a transversely-arranged chute 14, the bottom of which is slanted and the upper edge of which is at the same elevation as the axis of the adjacent roller and lies close against the face of said roller, but spaced slightly therefrom to permit of free rotation of the roller.

Each of the rollers consists of an iron or other metallic core 15', having a sheet or covering 16' of rubber.

In the operation of the present attachment the peanuts from the picker are discharged through the open upper end of the casing and onto the roller 9, it being understood that the casing is disposed to slant longitudinally. The roller, with the pulleys, being positively rotated, the stems of the peanuts will be drawn downwardly between such rollers and the adjacent coöperating rollers as the peanuts pass in the direction of the chute, and the stems will thus be snapped from the peanuts, the yieldable faces of the rollers insuring proper gripping action against stems of different sizes. When the stem is finally drawn from the nut, it is dropped from between the rollers, while the nut is permitted to continue its way to the chute, into which it finally passes to be discharged into a suitable receptacle.

It will be noted that the nuts travel transversely of the rollers and not longitudinally of them and that consequently the nuts of smaller size do not tend to enter between the rollers. Furthermore, the rollers by successively acting upon such nuts as may pass transversely of them before engagement of the stems thereof turn and twist the nuts, so that the stems are finally brought into position to enter between the rollers, where they are gripped and drawn from the peanuts, it being found that the final engagement of the stems is effected before the nuts pass over the entire series of rollers.

What is claimed is—

1. A peanut-stemmer, comprising an inclined casing pivoted at one end for movement in a vertical plane and having a discharge-chute at its lower end, a series of horizontal rollers journaled transversely of the casing, means connected with the alternate rollers for rotating them positively, and means for oscillating the casing on its pivot.

2. A peanut-stemmer comprising an inclined casing pivoted at one end for movement in a vertical plane and having a discharge-chute at its lower end, a transverse shaft at the end of the casing opposite to the pivot, said shaft having an eccentric portion, a wear-plate with which the eccentric portion of the shaft is engaged, a series of horizontal rollers journaled transversely of the casing, and means connected with the alternate rollers and with said shaft for rotating them.

3. A peanut-stemmer comprising an inclined casing having an inclined series of horizontal rollers mounted therein in close relation, means connected with the alternate rollers for rotating them positively, and a chute disposed at the lower end of the series of rollers to receive peanuts therefrom, each of said rollers consisting of a solid core and an elastic casing thereon.

In testimony whereof I affix my signature in presence of two witnesses.

CHARLES W. LASITER.

Witnesses:
LYCURGUS HOFLER,
J. E. LILLEY.